Oct. 21, 1941.  J. L. DRAKE  2,259,741
APPARATUS FOR TEMPERING GLASS
Filed March 17, 1932
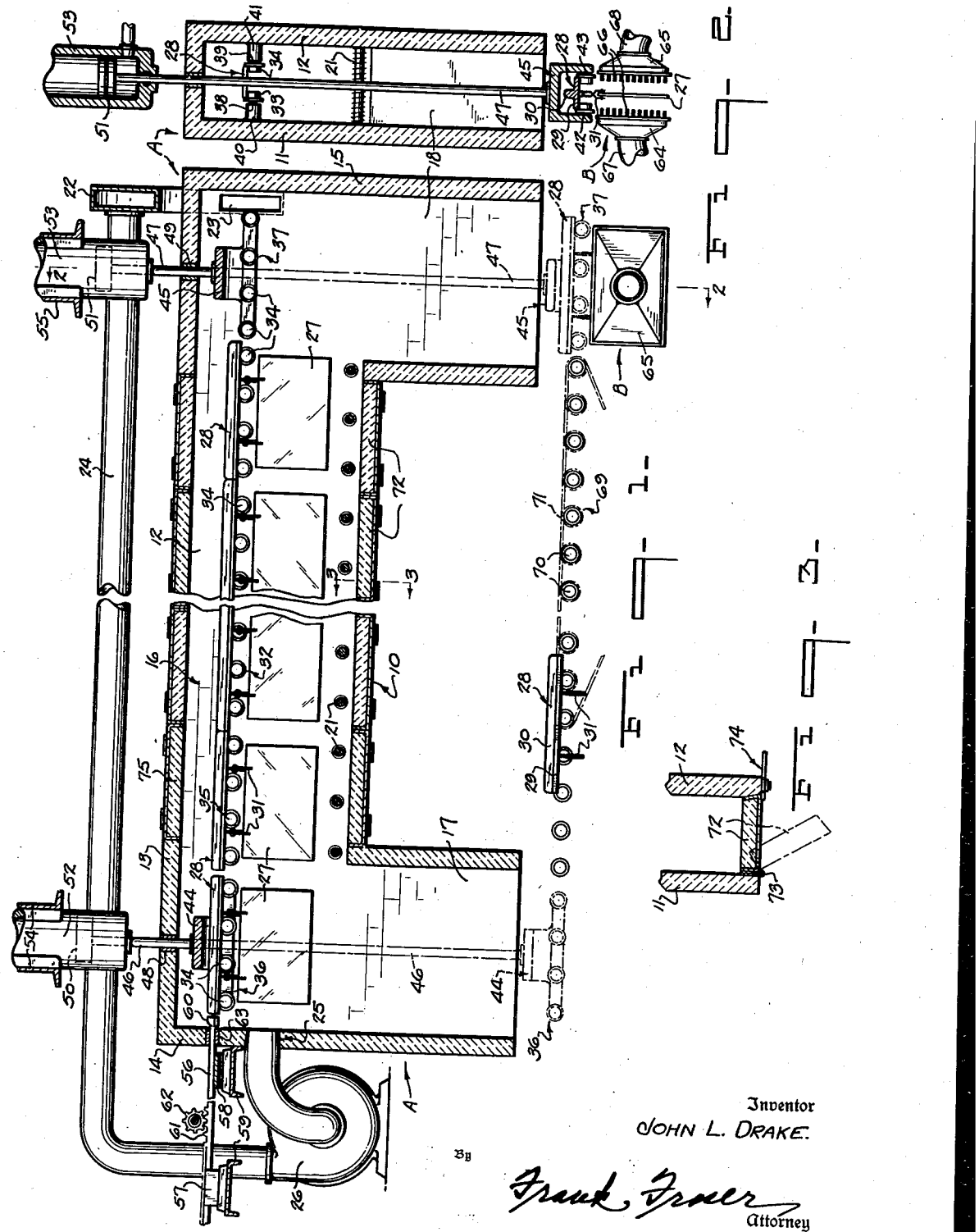
Inventor
JOHN L. DRAKE.
By Frank Fraser
Attorney Patented Oct. 21, 1941

2,259,741

UNITED STATES PATENT OFFICE 2,259,741

APPARATUS FOR TEMPERING GLASS

John L. Drake, Toledo, Ohio, assignor to Libbey-Owens-Ford Glass Company, Toledo, Ohio, a corporation of Ohio Application March 17, 1938, Serial No. 196,339

10 Claims. (Cl. 49—47)

The present invention relates to the tempering of glass and more particularly to improved apparatus for tempering glass sheets or plates in a continuous or semi-continuous manner.

Generally speaking, such tempering consists in first heating a sheet of glass to approximately its point of softening and in then rapidly chilling the same to place the outer surfaces of the sheet under compression and the interior under tension. Glass sheets tempered in this manner have utility as a form of safety glass since the treatment thereof not only materially increases the mechanical strength of the glass but also changes the breaking characteristics of the sheet in that when broken, it will disintegrate into innumerable small and relatively harmless fragments instead of breaking into large, dangerous pieces or splinters as is the case of ordinary glass sheets. In order to produce tempered glass sheets having a predetermined breaking pattern it is of primary importance that the heating and subsequent cooling of the sheets be uniform and accurately controlled.

In the tempering of sheets of glass in a continuous manner, with the forms of apparatus heretofore employed, considerable difficulty has been experienced due to the exchange of air between the heated interior of the furnace in which the sheets are heated and the relatively cold outside atmosphere, particularly during the charging and discharging of the glass sheets into and from the furnace. This exchange of air not only cuts down the efficiency of the furnace, because of the loss of heat therefrom, but also results in the setting up of uncontrolled currents of air within the furnace which interfere with the accurate control of the temperature therein and adversely affect the uniform heating of the glass sheets.

It is an aim of this invention to minimize, if not entirely eliminate, these difficulties by the provision of novel apparatus for effecting the tempering of glass sheets or plates in a substantially continuous manner whereby a plurality of sheets or groups of sheets may be continuously maintained in progressively different stages of treatment and wherein the treatment, particularly the heating, of the sheets or groups of sheets may be uniformly and accurately controlled.

Broadly speaking, the apparatus contemplated by the present invention includes a tunnel type heating furnace having entrance and discharge openings in the bottom thereof, preferably adjacent its opposite ends, together with suitable means whereby untreated glass sheets may be first moved upwardly into the furnace, advanced therethrough during heating of the sheets, and the properly heated sheets subsequently moved downwardly out of the furnace and into position for cooling.

Another object of the invention is the provision, in apparatus of the above character, of means for creating a controlled movement of heated air within the furnace whereby to facilitate the uniform and accurately controlled heating of the glass sheets during passage therethrough.

Other objects and advantages of the invention will become more apparent during the course of the following description, when taken in connection with the accompanying drawing.

In the drawing, wherein like numerals are employed to designate like parts throughout the same:

Fig. 1 is a longitudinal vertical section through an apparatus embodying the present invention;

Fig. 2 is a transverse vertical section taken substantially on line 2—2 in Fig. 1; and Fig. 3 is a fragmentary section taken substantially on line 3—3 in Fig. 1.

Referring now more particularly to the drawing, the apparatus herein provided includes a furnace A of substantially inverted U shape in longitudinal section, and in which the glass sheets to be tempered are adapted to be heated. Associated with the discharge end of the furnace A is a suitable cooling means B adapted to receive the heated glass sheets from the furnace and to effect the desired cooling thereof. The cooling means B is preferably positioned beneath the furnace A as shown to permit the heated glass sheets to be readily transferred from the latter to the former.

The furnace A comprises a floor 10, spaced vertical side walls 11 and 12, roof 13 and end walls 14 and 15 which cooperate to form a horizontally arranged, longitudinal extending heating chamber 16 of tunnel construction. Extending downwardly from the heating chamber 16 and communicating therewith, adjacent its opposite ends, are the vertical entrance and discharge passageways 17 and 18 respectively.

Any suitable heating means may be provided for the furnace A but as here shown there is arranged in the heating chamber 16, adjacent the floor 10 thereof, a series of electrical resistance units 21 extending transversely of said heating chamber. By proper regulation of the resistance units 21, the desired temperature can be maintained in the heating chamber 16 so that the heating of the glass sheets during the passage thereof through the heating chamber may be accurately and uniformly controlled. Further, due to the tendency of heated air to rise and the tendency of cold air to fall, there will be practically no exchange of air between the heated interior of the furnace and the relatively colder outside atmosphere at any time during the operation of the furnace.

In other words, since the temperature of the air outside the furnace A will be relatively cool there will be no tendency for this cool air to move upwardly to displace the warm air in the passageways 17 and 18. Similarly, there will be no tendency for the heated air within the furnace to move downwardly through said passageways into the outside atmosphere. Moreover, the tendency of the heated air within the entrance end of the furnace, including the passageway 18, to rise will be substantially equalized by the corresponding tendency of the heated air within the discharge end of the furnace, including the passageway 19, so that the air within the furnace is normally substantially motionless and free from uncontrolled air currents.

However, it has been found desirable in the production of tempered glass sheets in a continuous manner to provide a controlled flow of heated air through the furnace. To this end, there has been provided positive means for creating a continuous and uniform movement of heated air, at a substantially predetermined rate of flow, from the entrance end to the discharge end of the heating chamber 16. As illustrated in the drawing, this means comprises a manifold 22 communicating with the discharge end of the chamber 16 through oppositely disposed openings 23 (only one of which is shown) in the side walls 11 and 12 thereof and having suitable connection with a conduit 24 communicating with the entrance end of chamber 16 through an opening 25 in the front end wall thereof. Interposed in the conduit 24 is a blower 26 operatively connected to a variable speed motor or the like (not shown), so that upon operation of the blower 26 a continuous and uniform flow of heated air through the heating chamber 16 will be provided and further, that this air flow can be controlled in a manner to effect the heating of the glass sheets in the most efficient and satisfactory manner.

Glass sheets 27 are adapted to be suspended during the treatment thereof from suitable carriages 28, of substantially inverted T shape in cross section, each comprising a flat rectangular supporting plate 29 and an upwardly extending rib 30. Carried upon the underside of the plate 29 are tongs 31 adapted to grip a glass sheet 27 along its upper edge and to support it vertically from the carriage 28. Obviously, each of the carriages 28 may be readily adapted to support either a single large sheet as shown or a plurality of smaller sheets as desired.

In order to support the carriages 28 during movement of the glass sheets through the furnace A there is provided within the upper portion of the heating chamber 16 a horizontally extending roller runway 32 consisting of pairs of spaced, oppositely disposed flanged wheels 33 and 34. The runway 32 is preferably constructed with a stationary middle portion 35 and vertically movable end portions or sections 36 and 37 positioned above the vertical entrance and discharge passageways 17 and 18 respectively. The flanged wheels 33 and 34 of the middle portion 35 of runway 32 are rotatably mounted on stub shafts 38 and 39 (Fig. 2) fixed in bosses 40 and 41 respectively extending inwardly from the side walls 11 and 12 of the heating chamber 16. The wheels 33 and 34 of the movable end sections 36 and 37 of runway 32 are similarly mounted on stub shafts 42 and 43 (Fig. 2) carried by the opposed side portions of inverted U shaped castings 44 and 45 secured to the lower ends of rods 46 and 47 respectively. The rods 46 and 47 are vertically slidable in bushings 48 and 49 in the roof 13 of the furnace and are fixed at their upper ends to the pistons 50 and 51 respectively which are mounted to reciprocate within the respective air cylinders 52 and 53 carried by angle irons 54 and 55. Upon operation of the air cylinders 52 and 53 in the customary manner to effect reciprocation of the pistons 50 and 51 therein, a similar movement will be transmitted to the movable sections 36 and 37 of the runway 32 by means of the rods 46 and 47.

In this manner, the end section 36 of the runway may be moved downwardly to the position shown in broken lines in Fig. 1 to receive a carriage 28 which may then be loaded with a glass sheet 27 to be treated, after which the section 36 can be moved upwardly into alignment with the stationary middle section 35 as indicated in full lines in Fig. 1, whereupon the carriage 28 may be moved onto the latter and subsequently advanced therealong through the furnace. The end section 37 may be moved vertically in a similar manner, being first maintained in the position shown in full lines to receive a carriage 28 from the middle section 35 and then being moved downwardly into the broken line position to bring the glass sheet 27 carried thereby into position to be acted upon by the cooling means B.

The means for moving the carriages 28 from the section 36 onto section 35, advancing them through the heating chamber 16 and for subsequently moving them from said section 35 onto section 37 is here shown as embodying a pusher bar 56 slidably mounted in suitable bearing members 57 and 58 carried upon channel irons 59. The pusher bar 56 is provided at its inner end with an enlarged head 60 and on its upper surface with rack teeth 61 which are adapted to be engaged by the teeth of a pinion 62 driven in any suitable manner to effect sliding movement of the pusher bar 56 through the bushing 63 in the end wall 14 of furnace A.

With the movable section 36 of runway 32 supporting a loaded carriage 28 in the full line position in Fig. 1, the pusher bar 56 is moved inwardly causing the head 60 thereof to engage the said carriage 28 and to move it forwardly from the section 36 onto stationary section 35. The carriage 28, moving from the section 36, will engage the rear end of the first carriage on section 35 and will thus move all of the carriages on this section one step forward. At the same time, the last carriage on section 35 will be moved therefrom onto the movable section 37 whereupon this carriage may be moved downwardly out of the furnace to bring the glass sheet carried thereby into position for cooling. Although the means herein provided for supporting and conveying the glass supporting carriages 28 through the furnace may be taken as a preferred form of apparatus, it will be understood that other types of supporting and conveying means for such carriages might also be used.

This invention is also not limited to any particular form of cooling means and the apparatus B illustrated in the drawing is of a conventional type comprising a pair of spaced, oppositely disposed blower heads 64 and 65 between which the heated glass sheet to be cooled is adapted to be positioned. The opposing faces of the blower heads are each provided with a plurality of spaced nipples 66 through which compressed air, supplied to the blower heads through flexible conduits 67 and 68, may be discharged upon the opposite surfaces of the glass sheet. When a glass sheet 27 is brought into cooling position between the blower heads 64 and 65, the sheet will be rapidly chilled by blasts or jets of air directed onto both sides thereof simultaneously through the nipples 66. The blower heads 64 and 65 may be maintained stationary during the cooling operation or caused to oscillate or otherwise move in the plane of the sheet as desired.

After the sheet has been properly cooled, it may be removed from supporting carriage 28 and the said carriage returned to loading position upon the movable runway section 36 which at this time has been lowered to the broken line position in Fig. 1. For this purpose, there is provided a roller runway 69 positioned beneath the furnace A and in horizontal alignment with the movable sections 36 and 37 of runway 32 when these sections are in their lowered positions. The runway 69 is similar in construction to runway 32, being preferably provided with pairs of spaced, oppositely disposed flanged wheels 70 driven by chain and sprocket connections 71 associated with any suitable source of power.

To provide for the removal of broken glass from the heating chamber 16 and to permit access to the heating units 21, the floor 10 of the furnace may be formed of sections or doors 72 hinged to the side wall 11 as at 73. When necessary, any one of the doors 72 may be opened as shown in broken lines in Fig. 3, although they are normally held closed by means of the latch members 74. Similar doors 75 may be provided in the roof 13 to permit access to the runway 32 and the carriages 28 carried thereby.

In operation, an untreated glass sheet 27 is adapted to be suspended from a carriage 28 after the said carriage has been received upon the movable runway section 36 which, at such time, is in its lowered broken line position shown in Fig. 1. The runway section 36 is then moved upwardly into alignment with the stationary section 35 whereupon the carriage 28 will be advanced step by step through the heating chamber 16, by means of the pusher bar 56, until it rests upon the movable runway section 37 at the discharge end of the furnace. The runway section 37 is then moved downwardly to bring the carriage 28 into cooling position at which time the glass sheet 27 carried thereby is located between the blower heads 64 and 65 where it will be rapidly chilled by the blasts or jets of compressed air therefrom. After the sheet has been properly cooled, it can be removed from the carriage 28 and the carriage returned, upon the runway 69, to loading position. Although it is not considered necessary, the lower ends of the passageways 17 and 18 may be provided with doors or other closure means if desired.

In addition to the advantages to be obtained by the use of the improved apparatus herein disclosed, the method of handling the glass sheets during the heat treatment thereof as set forth above is also of decided advantage. Thus, glass sheets suspended vertically from their upper edges are extremely susceptible to strains when in a relatively soft and heated condition, especially during movement thereof. Further, that an upward movement of a heated sheet, so supported, will place a greater strain thereon than a downward movement. Consequently, the moving of the glass sheets upwardly into the furnace when cold and then moving them downwardly after being heated and softened will reduce the tendency toward warping and stretching of the sheet and the setting up of strains therein to a minimum.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the tempering of glass sheets, a horizontally elongated tunnel type furnace sealed from the outside atmosphere except for entrance and discharge openings in the bottom thereof, means for heating said furnace, means for introducing untreated glass sheets upwardly through said entrance opening into the furnace, means for advancing said sheets through said furnace to discharge position, and means for moving the heated sheets downwardly through said discharge opening into position for cooling.

2. In apparatus for use in the tempering of glass sheets, a substantially straight, horizontally extending tunnel type furnace sealed from the outside atmosphere except for a substantially vertical entrance passageway communicating with the bottom thereof adjacent one end and a substantially vertical discharge passageway communicating with the bottom of said furnace adjacent its opposite end, means for heating said furnace, means for introducing untreated glass sheets upwardly through said entrance passageway into the furnace, means for advancing said sheets in a substantially straight, horizontal direction through said furnace to discharge position, and means for moving the heated sheets downwardly through said discharge passageway into position for cooling.

3. In apparatus for use in the tempering of glass sheets, a horizontal tunnel type furnace sealed from the outside atmosphere except for an entrance opening and a discharge opening in the bottom thereof, means for heating said furnace, means for maintaining and controlling a continuous and uniform flow of heated air through said furnace, means for introducing untreated glass sheets upwardly through said entrance opening into the furnace, means for advancing said sheets through said furnace to discharge position, and means for moving the heated sheets downwardly through said discharge opening into position for cooling.

4. In apparatus for use in the tempering of glass sheets, a horizontal tunnel type furnace having entrance and discharge openings in the bottom thereof adjacent its opposite ends, means for heating said furnace, means for maintaining a continuous and uniform flow of heated air through said furnace from one end thereof to the other, means for introducing untreated glass sheets upwardly through said entrance opening into the furnace, means for advancing said sheets through said furnace to discharge position, and means for moving the heated sheets downwardly through said discharge opening into position for cooling.

5. In apparatus for use in the tempering of glass sheets, a horizontal tunnel type furnace having entrance and discharge openings in the bottom thereof adjacent its opposite ends, means for heating said furnace, means for continuously removing air from one end of the furnace and for simultaneously introducing heated air at the opposite end thereof, means for introducing untreated glass sheets upwardly through said entrance opening into the furnace, means for advancing said sheets through said furnace to discharge position, and means for moving the heated sheets downwardly through said discharge opening into position for cooling.

6. In apparatus for use in the tempering of glass sheets, a substantially straight, horizontal tunnel type furnace having a substantially vertical entrance passageway communicating with the bottom thereof adjacent one end and a substantially vertical discharge passageway communicating with the bottom of said furnace adjacent its opposite end, means for heating said furnace, means for continuously removing air from one end of the furnace and for simultaneously introducing heated air at the opposite end thereof, means for introducing untreated glass sheets upwardly through said entrance passageway into the furnace, means for advancing said sheets through said furnace to discharge position, and means for moving the heated sheets downwardly through said discharge passageway into position for cooling.

7. In apparatus for use in the tempering of glass sheets, a horizontal tunnel type furnace having entrance and discharge openings in the bottom thereof adjacent its opposite ends, means for heating said furnace, means for continuously removing air from opposite sides of the furnace adjacent one end thereof and for simultaneously introducing heated air into the opposite end of said furnace, means for introducing untreated glass sheets upwardly through said entrance opening into the furnace, means for advancing said sheets through said furnace to discharge position, and means for moving the heated sheets downwardly through said discharge opening into position for cooling.

8. In apparatus for use in the tempering of glass sheets, a horizontal tunnel type furnace having entrance and discharge openings in the bottom thereof adjacent its opposite ends, means for heating said furnace, a conduit connecting the opposite ends of said furnace, means interposed in said conduit for continuously removing heated air from one end of the furnace and introducing said air into the opposite end of said furnace, means for introducing untreated glass sheets upwardly through said entrance opening into the furnace, means for advancing said sheets through said furnace to discharge position, and means for moving the heated sheets downwardly through said discharge opening into position for cooling.

9. In apparatus for use in the tempering of glass sheets, a horizontal tunnel type furnace sealed from the outside atmosphere except for entrance and discharge openings in the bottom thereof adjacent its opposite ends, means for heating said furnace, carriages for supporting the glass sheets within said furnace, conveyor means upon which said carriages are adapted to be advanced through the furnace including a vertically movable section at one end thereof for moving the carriages upwardly through said entrance opening into the furnace and a second vertically movable section at the opposite end of the conveyor means for receiving the carriages and moving them downwardly through said discharge opening to bring the glass sheets into position for cooling, and means for operating said vertically movable conveyor sections.

10. In apparatus for use in the tempering of glass sheets, a substantially straight horizontal tunnel type furnace having a substantially vertical entrance passageway communicating with the bottom thereof adjacent one end and a substantially vertical discharge passageway communicating with the bottom of said furnace adjacent its opposite end, means for heating said furnace, carriages for supporting the glass sheets within said furnace, a roller runway for receiving said carriages including a stationary section and vertically movable sections at the opposite ends of said stationary section, means engageable with said carriages to advance them through said furnace along said runway, means for supporting and moving the vertically movable section at one end of the runway to move the sheet supporting carriages upwardly through said entrance passageway into the furnace, and means for supporting and moving the vertically movable section at the opposite end of said runway to move the said sheet supporting carriages downwardly through said discharge passageway to bring the glass sheets into position for cooling.

JOHN L. DRAKE.